(12) United States Patent
Ward et al.

(10) Patent No.: US 8,572,921 B2
(45) Date of Patent: Nov. 5, 2013

(54) ONE PIECE HIP AND RIDGE SHINGLE

(75) Inventors: Bryan Ward, Olathe, KS (US); Ray Rosewall, Blue Springs, MO (US); Timothy Gentry, Mission Hills, KS (US)

(73) Assignee: Davinci Roofscapes, LLC, Kansas City, KS (US)

( * ) Notice: Subject to any disclaimer, the term of this patent is extended or adjusted under 35 U.S.C. 154(b) by 0 days.

(21) Appl. No.: 12/748,977

(22) Filed: Mar. 29, 2010

(65) Prior Publication Data

US 2010/0275542 A1 Nov. 4, 2010

Related U.S. Application Data

(60) Provisional application No. 61/211,175, filed on Mar. 27, 2009.

(51) Int. Cl.
*E04D 1/12* (2006.01)

(52) U.S. Cl.
CPC ........................................ *E04D 1/12* (2013.01)
USPC ................................................ 52/519; 52/518

(58) Field of Classification Search
USPC .................................................. 52/518–560
See application file for complete search history.

(56) References Cited

U.S. PATENT DOCUMENTS

| | | | |
|---|---|---|---|
| 2,624,298 A | 1/1953 | Farren | |
| 2,730,969 A * | 1/1956 | Perry | ................................ 52/276 |
| 2,735,143 A | 2/1956 | Kearns | |
| 2,830,546 A | 4/1958 | Rippe | |
| 3,060,163 A | 10/1962 | Erchak | |
| 3,164,929 A * | 1/1965 | Boddie | ........................... 52/531 |
| 3,269,575 A | 8/1966 | Cosden | |
| 3,347,001 A | 10/1967 | Cosden | |
| 3,579,940 A | 5/1971 | Greenleaf | |
| 3,667,184 A | 6/1972 | Merrill | |
| 3,852,934 A | 12/1974 | Kirkhuff | |
| 3,903,340 A | 9/1975 | Shepard | |
| 3,983,675 A | 10/1976 | Pearse | |
| 4,010,590 A | 3/1977 | Reinke | |
| 4,067,256 A | 1/1978 | Turner | |
| 4,141,187 A | 2/1979 | Graves | |
| 4,191,722 A * | 3/1980 | Gould | ............................. 52/540 |
| 4,193,898 A | 3/1980 | Miller | |
| 4,214,918 A | 7/1980 | Grat | |
| 4,252,603 A | 2/1981 | Kharsus | |
| 4,268,572 A | 5/1981 | Toland | |

(Continued)

OTHER PUBLICATIONS

Davinci Roofscapes, Inc., New DaVinci Hip & Ridge System Simplifies Installation, Press Release, Published Apr. 22, 2008.

(Continued)

*Primary Examiner* — Mark Wendell
*Assistant Examiner* — Matthew J Smith
(74) *Attorney, Agent, or Firm* — Bryan Cave LLP

(57) ABSTRACT

The invention provides a one piece shingle for use on roof ridges and hips. Shingles of the invention are preferably formed from synthetic materials and preferably comprise a blend of high and low molecular weight polyethylene resins. The unique blend of materials provides a shingle that is both strong while retaining sufficient flexibility to permit the shingle to bend to accommodate a variety of pitches at a ridge or hip. Unique features of the shape and structure of the shingle also make it particularly suited to hip and ridge applications. Furthermore, methods of manufacturing hip and ridge shingles are also disclosed.

18 Claims, 14 Drawing Sheets

(56) References Cited

U.S. PATENT DOCUMENTS

| | | | |
|---|---|---|---|
| 4,301,633 A | 11/1981 | Neumann | |
| 4,514,947 A | 5/1985 | Grail | |
| 4,914,885 A | 4/1990 | Baker | |
| 5,070,671 A | 12/1991 | Fitfield | |
| 5,174,092 A | 12/1992 | Naden | |
| 5,189,083 A | 2/1993 | Gelles | |
| 5,190,997 A | 3/1993 | Lindemann | |
| 5,214,082 A | 5/1993 | Gelles | |
| 5,215,598 A | 6/1993 | Konzuma | |
| 5,295,340 A * | 3/1994 | Collins | 52/518 |
| 5,305,570 A | 4/1994 | Rodriguez | |
| 5,437,735 A | 8/1995 | Younan | |
| 5,502,940 A | 4/1996 | Fitfield | |
| 5,528,872 A | 6/1996 | Rotter | |
| 5,575,861 A | 11/1996 | Younan | |
| 5,603,758 A | 2/1997 | Schreifels | |
| 5,613,337 A | 3/1997 | Plath | |
| 5,615,523 A | 4/1997 | Wells | |
| 5,644,886 A | 7/1997 | Ekmark | |
| 5,711,126 A | 1/1998 | Wells | |
| 5,784,848 A | 7/1998 | Toscano | |
| 5,902,683 A | 5/1999 | Sieloff | |
| 5,974,756 A | 11/1999 | Alvarez | |
| 6,021,611 A * | 2/2000 | Wells et al. | 52/520 |
| 6,070,384 A | 6/2000 | Chich | |
| 6,120,913 A | 9/2000 | Kluttz | |
| 6,178,703 B1 | 1/2001 | Noone | |
| 6,180,871 B1 | 1/2001 | Campbell | |
| 6,194,519 B1 | 2/2001 | Blalock | |
| 6,233,895 B1 | 5/2001 | Evans | |
| 6,282,858 B1 | 9/2001 | Swick | |
| 6,415,562 B1 | 7/2002 | Donaghue | |
| 6,418,692 B1 | 7/2002 | Freshwater | |
| 6,530,189 B2 | 3/2003 | Freshwater | |
| 6,540,829 B2 | 4/2003 | Allman | |
| RE38,210 E | 8/2003 | Plath | |
| 6,619,006 B1 | 9/2003 | Shirota | |
| 6,679,308 B2 | 1/2004 | Becker et al. | |
| 6,715,252 B2 | 4/2004 | Stahl et al. | |
| 6,729,081 B2 | 5/2004 | Nath | |
| 6,758,019 B2 | 7/2004 | Kalkanoglu et al. | |
| 6,808,785 B1 | 10/2004 | Friedman et al. | |
| 6,907,702 B2 | 6/2005 | Gilbert et al. | |
| 7,003,922 B2 | 2/2006 | Fitfield | |
| 7,118,794 B2 | 10/2006 | Kalkanoglu et al. | |
| 7,125,601 B1 | 10/2006 | Pinault | |
| 7,140,153 B1 | 11/2006 | Humphreys | |
| 7,155,866 B2 | 1/2007 | Bezubic, Jr. et al. | |
| 7,241,500 B2 | 7/2007 | Shiao et al. | |
| 7,331,150 B2 | 2/2008 | Martinique | |
| 7,473,722 B2 * | 1/2009 | Guiselin et al. | 523/218 |
| 7,520,098 B1 | 4/2009 | Martinique | |
| 7,563,478 B1 | 7/2009 | Humphreys | |
| 2002/0189188 A1 | 12/2002 | Iole | |
| 2006/0260731 A1 | 11/2006 | Kalkanoglu | |
| 2007/0107356 A1 | 5/2007 | Steffes | |
| 2008/0028705 A1 | 2/2008 | Morse | |

OTHER PUBLICATIONS

Davinci Roofscapes, Inc., DaVinci Shake Installation Guide, Published Apr. 2008.
Davinci Roofscapes, Inc., DaVinci Slate Installation Guide, Published Apr. 2008.

* cited by examiner

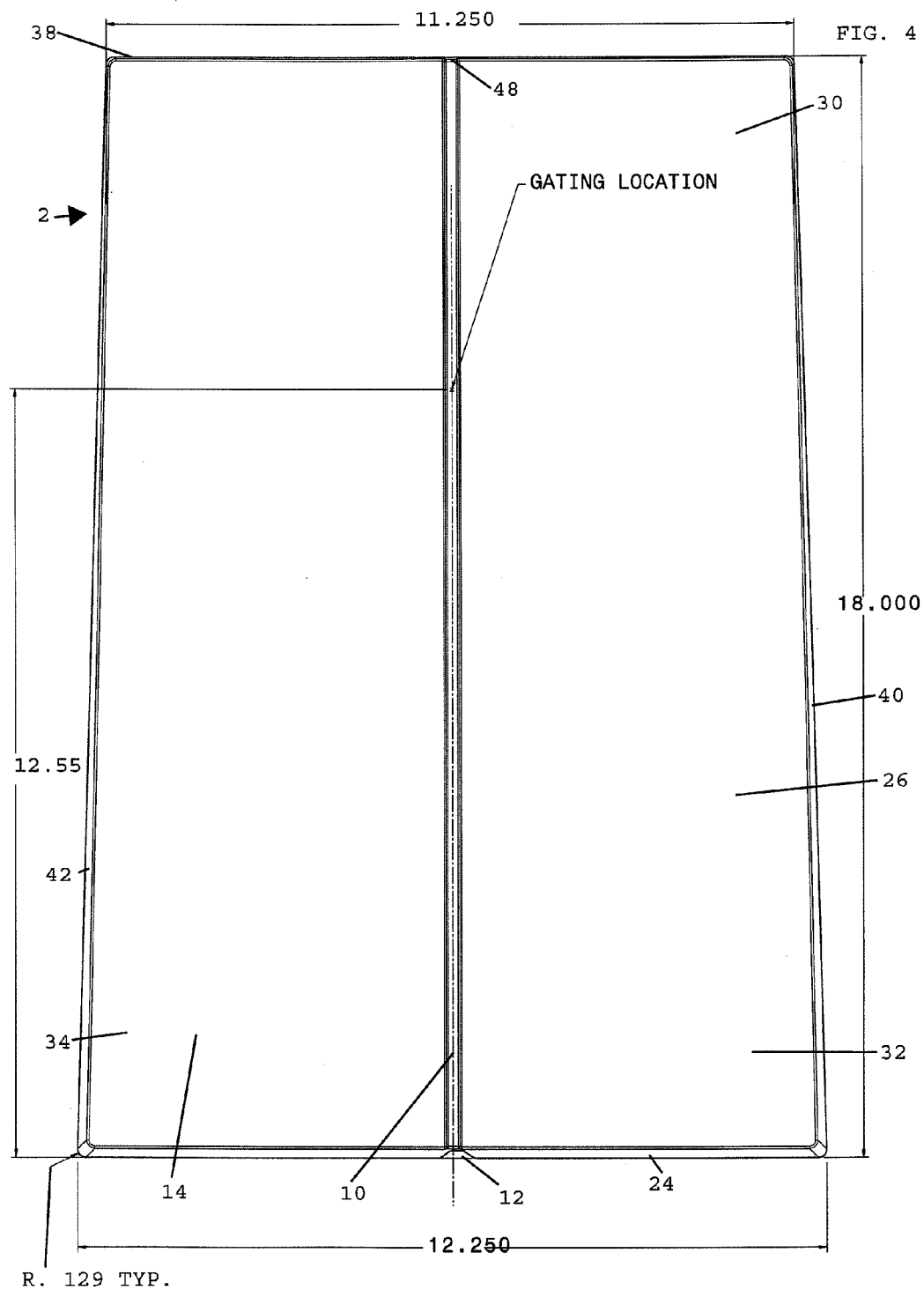

US 8,572,921 B2

ONE PIECE HIP AND RIDGE SHINGLE

FIELD OF THE INVENTION

The present invention is generally related to improved building materials and more particularly related to improved hip and ridge shingles.

BACKGROUND OF THE INVENTION

Roof hips and ridges present special challenges for the roofing professional. Particularly challenging are applications using synthetic shingles, e.g., shingles constructed from plastic resins. These shingles may be thicker than more traditional shingle materials, such as shingles constructed from metal or bitumen compounds. Furthermore, such synthetic shingles may have a substantially open underside that would be exposed if the shingle were cut and that would be undesirable if visible. In addition, such shingles may have an upper portion that is not intended to be visible, but that may be difficult to obscure with an adjacent shingle in certain ridge or hip applications.

One method of ridge or hip installation that can be successful in some instances is to lay a double course of shingles along the center point of the ridge or hip. Although this installation method can produce an aesthetically pleasing result, it can be time consuming to achieve.

Thus, a need exists for a hip and ridge shingle, suitable for use with shingles constructed from synthetic materials, that (1) is easier to install than traditional hip and ridge shingles, (2) provides an aesthetically-pleasing result, and (3) otherwise overcomes the deficiencies of prior art hip and ridge shingles and methods of installing them.

BRIEF DESCRIPTION OF THE DRAWINGS

The invention will be better understood from a reading of the following detailed description, taken in conjunction with the accompanying Figures in which:

FIG. 4 is an illustration of the top of an exemplary shingle of the present invention, before it is bent.

Figure 1:
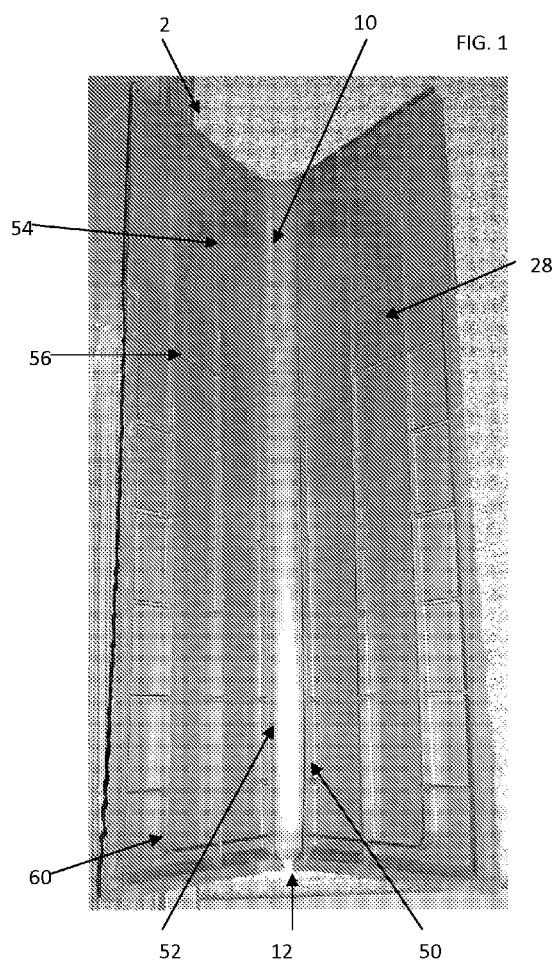
FIG. 1 is an illustration of the bottom an exemplary shingle of the present invention bent at the ridge portion.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "front," "back," "top," "bottom," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

SUMMARY OF THE INVENTION

An inventive shingle, having various embodiments, that (1) is easier to install than traditional hip and ridge shingles, (2) provides an aesthetically-pleasing result, and/or (3) otherwise overcomes the deficiencies of prior art hip and ridge shingles and methods of installing them has now been developed. Shingles of the present invention are uniquely designed one-piece shingles for application on a roof ridge or hip.

In one embodiment, the invention provides a shingle comprised of a blend of high and low molecular weight polyethylene resins and that substantially forms and isosceles trapezoid. Further inventive features of a shingle of the invention may include a notch, a rib portion, an alignment indicator, one or more positioning indicators, and/or ribs adapted to provide support for the shingle while accommodating the unique applications for shingles of this invention.

Methods of manufacturing a hip and ridge shingle are also provided in which a molten blend of polyethylene resins is injected into a mold adapted to form a shingle of this invention and wherein the newly-molded shingle is placed on a v-board (or similar device) to produce a bend at the ridge portion.

DETAILED DESCRIPTION OF THE INVENTION

Hip and ridge shingles of the present invention comprise a flexible ridge portion at which the shingle is bent to accommodate the pitch of the hip or ridge of the roof on which the shingle is installed. Flexibility in the ridge portion allows a single shingle to accommodate a wide variety of pitches—from the very steep to the nearly flat, promoting ease of installation.

A preferred embodiment of a shingle of this invention comprises a substrate wherein the substrate comprises a blend of high and low molecular weight polyethylene resins, such as described in U.S. Pat. No. 7,140,153, incorporated herein by reference in its entirety. A preferred blend of high and low molecular weight polyethylene resins will produce a shingle that has the requisite flexibility to permit a flexible bend at the ridge portion while providing a stiffness suitable for the requirements of a roofing shingle. Other components, such as fire retardants (e.g., magnesium hydroxide), fiberglass fibers, and antioxidants can be included in the substrate. Furthermore, shingles of this invention may optionally include a base coat and/or a top coat, such as a base coat and/or top coat as described in U.S. Pat. No. 7,140,153. In an exemplary embodiment, in the range of 65% to 55% by volume of the substrate is composed of a blend of high and low molecular weight polyethylene resins. For example, in one embodiment, approximately 60% by volume of the substrate is composed of a blend of high and low molecular weight polyethylene resins. Preferred relative portions of high molecular weight polyethylene resins range from approximately 35% to 55% percent by volume of the resin blend (wherein, again, the resin blend is preferably between about 65% and about 55% of the total); examples include approximately 55% by volume, 50% by volume, approximately 45% by volume, approximately 40% by volume, and approximately 35% by volume. Preferred relative portions of low molecular weight polyethylene resins range from approximately 45% to 65% percent by volume; examples include approximately 65% by volume, 60% by volume, approximately 55% by volume, approximately 50% by volume, and approximately 45% by volume.

In one embodiment, the substrate comprises approximately 31.5% high molecular weight polyethylene resins, approximately 27.9% low molecular weight polyethylene resins, and approximately 40.6% other ingredients. In another embodiment, the substrate comprises approximately 21.5% high molecular weight polyethylene resins, approximately 37.9% low molecular weight polyethylene resins, and approximately 40.6% other ingredients. In yet another embodiment, the substrate comprises approximately 25% high molecular weight polyethylene resins, approximately 35% low molecular weight polyethylene resins, and approximately 40% other ingredients.

Molding techniques known in the art can be used to create a molten blend of the substrate materials 1502 and transfer the molten blend into a mold 1504 to be formed into a substrate of a shingle (or, if no top and/or base coat will be applied to the shingle, to produce the shingle) 1506. In a preferred manufacturing technique, the mold will produce a substantially flat 1508 substrate then, while still warm, the substrate will be placed on a v-board (or similar device) to produce a bend at the ridge portion of the shingle 1510. Because shingles of the present invention will retain some flexibility after the substrate has completely cooled, the v-board (or similar device) does not need to match a particular pitch of a roof ridge or hip. Any coatings to be optionally applied to the substrate can be applied before or after the substrate has been placed on the v-board. References to "shingle" shall refer to the substrate, in the event no coatings are applied to the substrate, or to the substrate along with any coatings or other materials applied to and/or otherwise integrated with the shingle.

Alternatively, the substrate (or shingle) could be produced using a mold that incorporates a bend at the ridge portion; in such event, the step of placing the substrate (or shingle) on a v-board could be eliminated.

Turning again to the ridge portion 10 of the shingle 2, in the embodiment of FIG. 1-9, the ridge portion preferably comprises a notch 12 at the front edge 36 of the shingle 2. The exemplary notch 12 illustrated on FIGS. 4-9 comprises a set of walls 16, 18 angularly disposed from one another at an acute angle. Preferably, the angle formed by this set of walls will range from approximately 30 to approximately 60 degrees; a particularly preferred angle is approximately 45 degrees. In one embodiment, a first notch wall 16 is slanted rearwardly away from a center line 20 of the shingle 2 and the second notch wall 18 is slanted rearwardly toward such center line 20. In such embodiment, the first and second notch walls, at some degree of bending of the shingle at the ridge portion 10, would be substantially parallel along the width of the walls. Such an embodiment further facilitates shingle installation at a wide variety of pitches and, for a particularly steep pitch, would allow the first and second notch walls 16, 18 to come into contact with one another with minimal (or no) deformation.

In the exemplary embodiment of FIG. 1-9, the angle of the set of notch walls is chamfered 22. In the illustrated exemplary embodiment, the angle of the walls is symmetrically chamfered; other types of chamfering may be used. A chamfered notch may facilitate the bending of the first and second sides of a shingle toward each other at the ridge portion of the shingle with little or minimal distortion and/or malformation of the shingle, thus improving aesthetics. Furthermore, it may optimize both strength and flexibility in the shingle at the notch.

Thus, an exemplary shingle of this invention comprising a notch may: (1) provide enhanced design and/or installation options, e.g., by allowing the shingle to accommodate a wide variety of pitches at a roof hip or ridge, (2) maintain its aesthetic appearance after it is bent, and/or (3) provide superior wind and rain resistance features.

A "notch" may be provided by means other than (and/or in addition to) a void with angularly disposed walls (as described above). "Notch" may refer to a point on a front wall 24 of a shingle 2 at which the material comprising the shingle is sufficiently flexible (whether due to material composition, thickness, or otherwise) to allow bending with relative ease. Such a notch may include a feature, such as one or more grooves on the back side of the front wall that makes an aesthetically-preferred rearward disposition of the material of the front wall at the point of the notch more likely than a frontward disposition.

A notch may be formed as an integral part of process of manufacturing the shingle, e.g., a mold used in the creation of a substrate (or shingle) may incorporate a feature that will cause a notch to be formed. Alternatively, a notch may be formed in one or more subsequent steps. For example, using tools known in the art, the front wall 24 of a shingle of this invention may be clipped or otherwise cut (e.g., using a router) to form a "notch". The front wall 24 may comprise one or more "notch" comprising markings to indicate one or more preferred locations for clipping.

Figure 13:
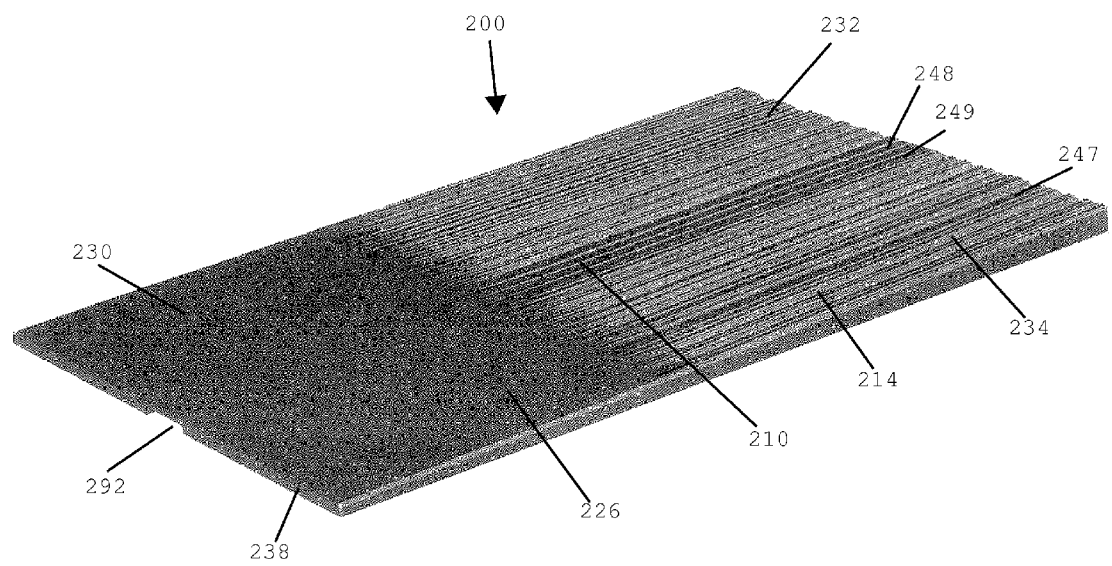
FIG. 13 is a top, right isometric illustration of the top of an exemplary shingle of the present invention, according to a second embodiment.
Figure 14:
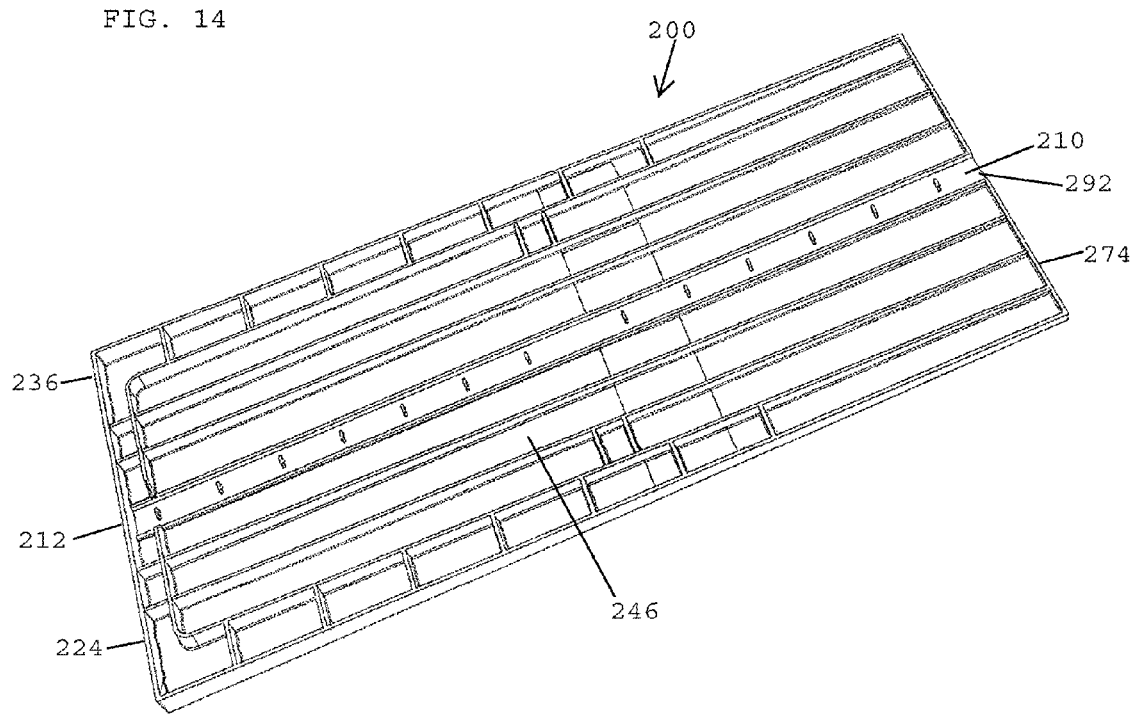
FIG. 14 is a bottom, right isometric illustration of the bottom of the shingle of FIG. 13.
Figure 15:
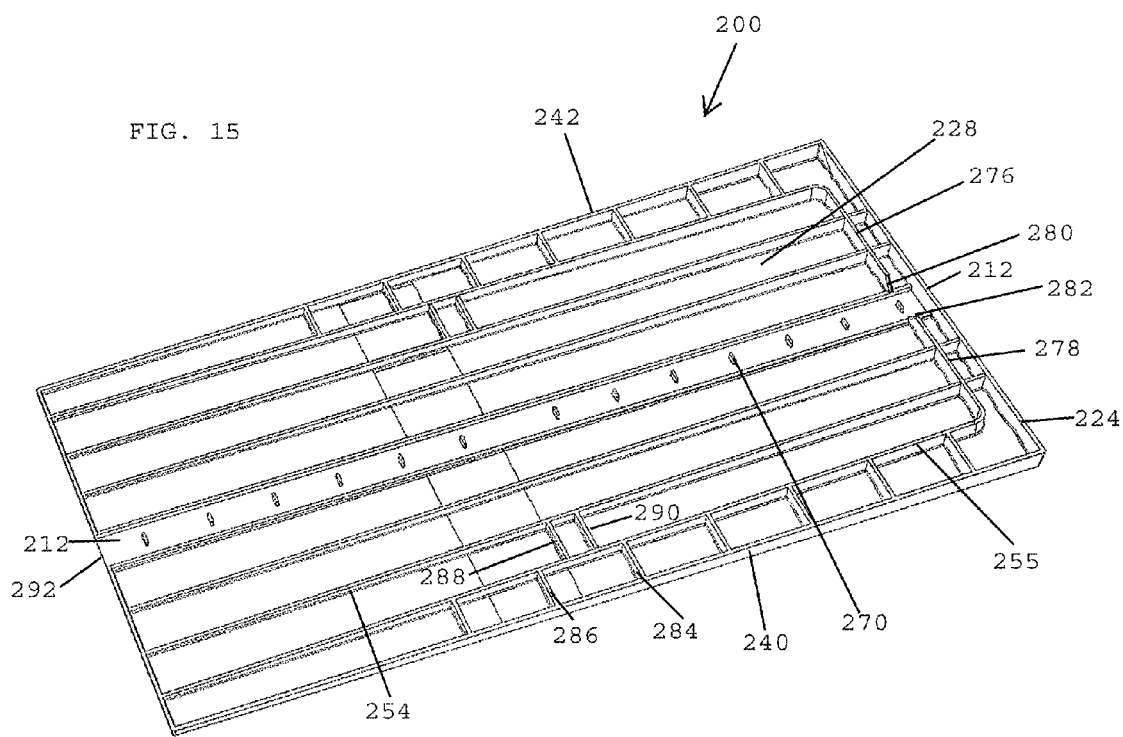
FIG. 15 is a bottom, left isometric illustration of the bottom of the shingle of FIG. 13.
Figure 16:
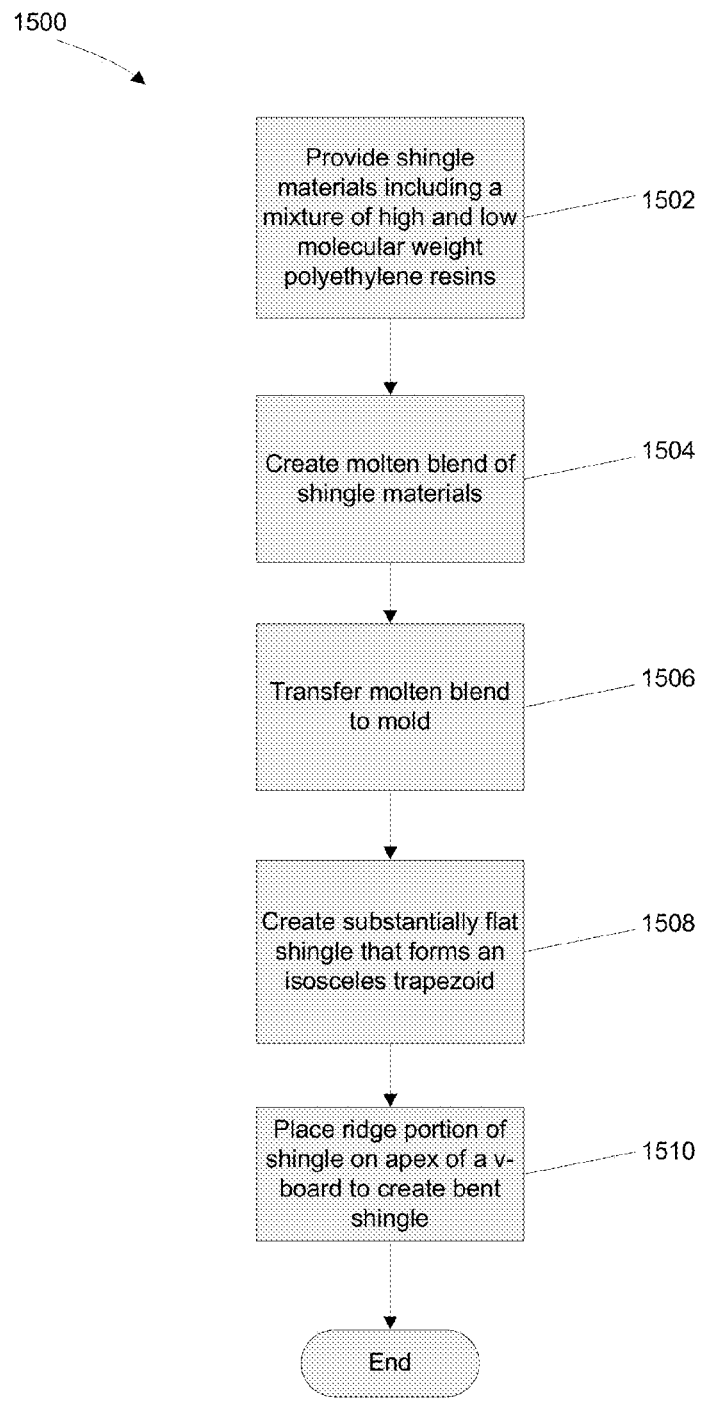
FIG. 16 is a flowchart illustrating a method of creating a shingle according to an embodiment of the invention.

In the exemplary embodiment of FIG. 13-15, the front wall 224 comprises an approximate mid-point at which the shingle can be bent. Preferably, a clip or router would be used at the notch 212 (e.g., in this embodiment, the "notch" comprises the approximate mid point of the front wall 224 of the shingle 200) to create a void in the front wall 224, thereby facilitating bending the shingle 200. In this embodiment, a first and second front rib 276, 278 are provided in which a first end 280, 282 terminates at or near the ridge portion and in which the first end 280, 282 forms an obtuse angle with the bottom 228 of the shingle 200 when flat. This inventive aspect promotes bending of the shingle at the ridge point without interference from the first and second ribs.

Optionally, a ridge portion 10 may comprise an alignment indicator 48 at the approximate center line 20 of the shingle. In the embodiment of FIGS. 1-12, the alignment indicator 48 is an integral part of the substrate (or shingle) that protrudes slightly above the top 26 of the shingle; specifically, the alignment indicator represents a portion of the shingle at which the shingle is somewhat thicker than the portions of the shingle immediately adjacent on either side. This embodiment of an alignment indicator serves a dual purpose of providing a benchmark to promote proper alignment of shingles during installation and promoting bending of the shingle at the center line 20 of the shingle.

Other forms of an alignment indicator (i.e., a feature to indicate the location of the center line 20 of the shingle) may be used, or the alignment indicator may be omitted. Other positioning indicators (not shown) may be used, such as one or more markings to illustrate, e.g., recommended insertion points for a fastener (e.g., a nail). Positioning indicators may be provided on the first and/or second sides 32, 34 of a shingle to illustrate the point at which to place the front edge 36 of an upper shingle to provide the desired front top portion 44 (discussed below). More than one such positioning indicator may be provided if for example, shingles may be used in installation methods in which the desired front top portion may vary.

Generally, a preferred insertion point for a fastener of a shingle of this invention (regardless of whether such insertion point is identified by a positioning indicator) is outside of the front top portion of the shingle and is in a rear portion of the shingle—a portion of the shingle that is preferably not exposed when the installation of a series of shingles of the invention along a hip or ridge is complete.

In the embodiment of a shingle 200 of the invention illustrated on FIG. 15, an alignment indicator 248 is provided by variation in the surface texture of the shingle 200 near the center line of the shingle. As illustrated in this exemplary embodiment, the surface of the shingle 200 is embossed to emulate a shake shingle. At the alignment indicator 248, the groves 249 that comprise the embossing are spaced at a somewhat wider distance and are somewhat shallower than the groves 247 outside of the alignment indicator 248 of the shingle 200. In addition to providing a visual and tactile representation of the center of the shingle, the innovative surface embossing of this embodiment of the shingle of the invention accommodates bending at the center line while minimizing the risk of cracking or breaking (e.g., at the base of a groove) and, furthermore, maintains the ascetically-pleasing representation of a shake across the center line. This embodiment offers the further advantage of permitting use of the shingle in an alternative flat format, promoting efficiency in the manufacturing process.

Figure 10:
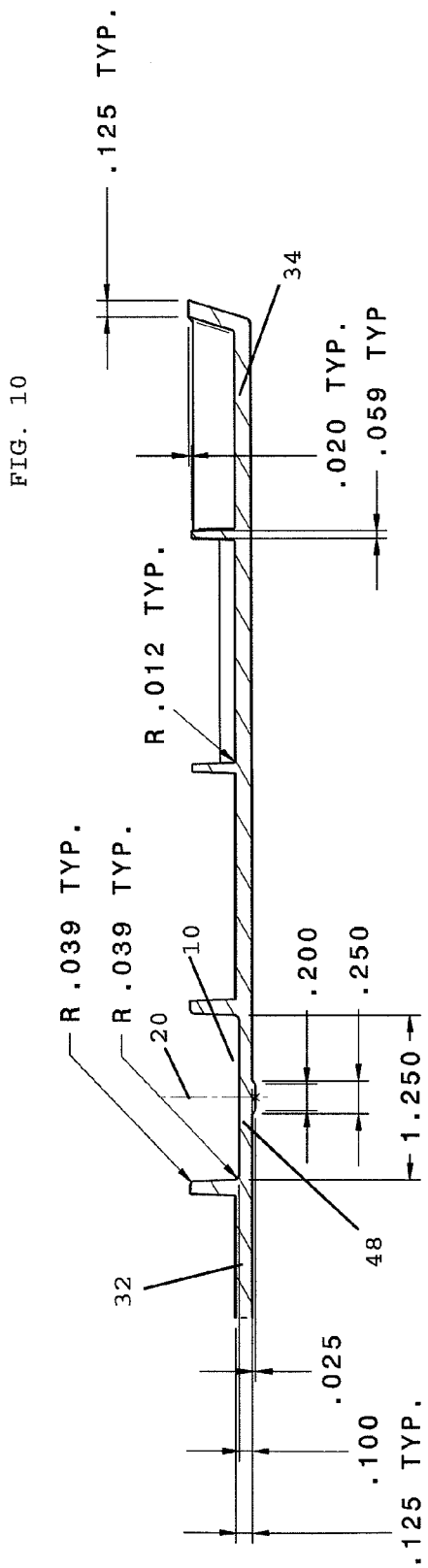
FIG. 10 is an illustration of a cross-section of the shingle of FIG. 5 at the line marked A-A.

As illustrated on FIG. 10, in a preferred shingle 2 of the invention, the shingle is somewhat thinner (not taking into consideration the optional thickened alignment indicator) at the ridge portion 10 than at the first and second sides 32, 34 of the shingle adjacent the ridge portion. This feature promotes bending at the ridge point 10.

Optionally, the ridge point 10 can be defined on either side by ribs 50, 52 on the bottom 28 of the shingle that are substantially perpendicular to the front edge 36 of the shingle. Although continuous ribs are illustrated, if ribs are included, they need not be continuous. Other perpendicular ribs 54 and/or ribs 56, 60 that are substantially parallel to the front edge, such as those illustrated on FIGS. 1, 5, and 7, may optionally be included; such ribs may promote strength and stability of a shingle. Preferably, however, (1) any ribs of a shingle of this invention that are substantially parallel to the front edge and that are provided outside of the ridge portion do not extent into the ridge portion, and (2) any such parallel ribs provided in the ridge portion do not extend beyond the ridge portion, since such features might compromise the ability to freely bend the shingle at the ridge portion.

As shown in the exemplary embodiment of FIG. 13-15, ribs 270 that are substantially parallel to the front wall 224 may optionally be included along the ridge portion 210 of a shingle 200 of this invention. Such ribs may promote strength and stability of the shingle at the ridge point. Furthermore, such ribs, by providing additional strength and stability at the center line, may allow a shingle 200 of this invention to be used both as a more traditional flat shingle and as a bent shingle at a hip or ridge. By providing an embodiment that can be used either as a flat shingle or as a bent shingle, manufacturing may be more efficient since a single mold can be used to create shingles for two different applications.

As illustrated in both exemplary embodiments, a series of parallel ribs 57, 59, 284, 286 are preferably provided between a first side edge 40, 240 and a first rib 55, 255. Furthermore, a set of parallel ribs 53, 56, 288, 290 are preferably provided between a first rib 55, 255 and a second rib 54, 254 at or near preferred positions for inserting a fastener, to provide stability at those points.

In addition to the ridge portion 10, 210 and as described in part above, a shingle of this invention will comprise: (1) a top 26, 226, (2) a bottom 28, 228, (3) a front portion 14, 214, (4) a rear portion 30, 230, (5) a first side 32, 232, and (6) a second side 34, 234.

Preferably, a shingle of the present invention forms (or substantially forms) an isosceles trapezoid in which (1) the front edge 36, 236 and the rear edge 38, 238 are substantially parallel, (2) the front edge is longer than the rear edge, and (3) the first side edge 40, 240 and the second side edge 42, 242 are substantially equidistant. Particularly preferred for a shingle of the present invention is one in which, for every inch of shingle length (in which length is the distance between the front edge and the rear edge, at the bottom of the shingle), there is a decrease in width from the front edge 36, 236 to the rear edge 38, 238 in the range of approximately 0.05 inches to approximately 0.06 inches; particularly preferred is approximately 0.056 inches. For example, a preferred shingle length, front edge width, and rear edge width are, respectively, approximately 18 inches, 12.25 inches, and 11.25 inches.

When a shingle of this invention comprises an isosceles trapezoid shape, it may aid in achieving one or more objectives of this invention, including: (1) improved aesthetics of a hip and ridge shingle, and (2) ease of installation of a hip and ridge shingle. Specifically, when this feature is included, the sides of the rear portion of a shingle are unlikely to protrude beyond the sides of the front portion of an upper shingle, when properly installed on a hip or ridge. The benefit of this features is illustrated on FIG. 3.

As discussed in part above, the front portion 14, 214 of a shingle 2, 200 of this invention includes: (1) a front top portion 44, 272, (2) a front edge 36, 236, (3) a front wall 24, 224, and (4) a front bottom portion 46, 246. When properly installed, some or all of the front top portion of a shingle of this invention will be exposed. As used herein, the term "front top portion" of a shingle refers to and includes the top of the front portion of the shingle that is or may be exposed when the shingle is properly installed. It will be understood by those with skill in the art that the portion of a shingle that is, in fact, exposed when installed may vary, e.g., depending upon the particular installation technique and/or position of a particular shingle. For example, when shingles of the present invention are installed using staggered coursing, two adjacent shingles will typically have different amounts of the front portion exposed after installation. Thus, depending upon the context, "front top portion" may refer to (1) the portion of the shingle that is actually exposed after installation and/or (2) the portion of the shingle that may be exposed without adversely effecting the aesthetics and/or function of the shingle.

Figure 3:
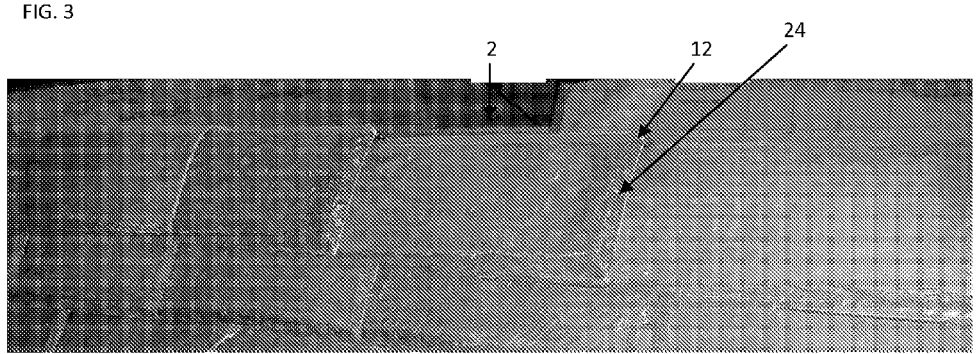
FIG. 3 is an illustration of a plurality of exemplary shingles of the present invention installed on a roof ridge.
Figure 2:
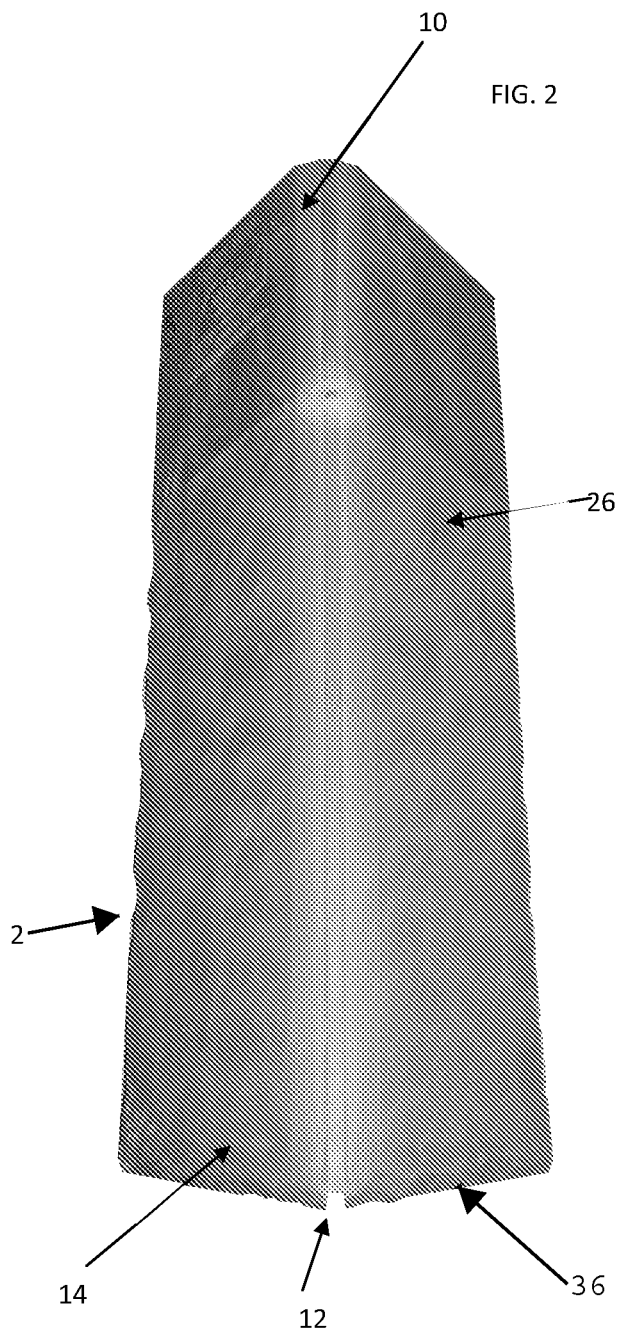
FIG. 2 is an illustration of the top an exemplary shingle of the present invention bent at the ridge portion.
Figure 5:
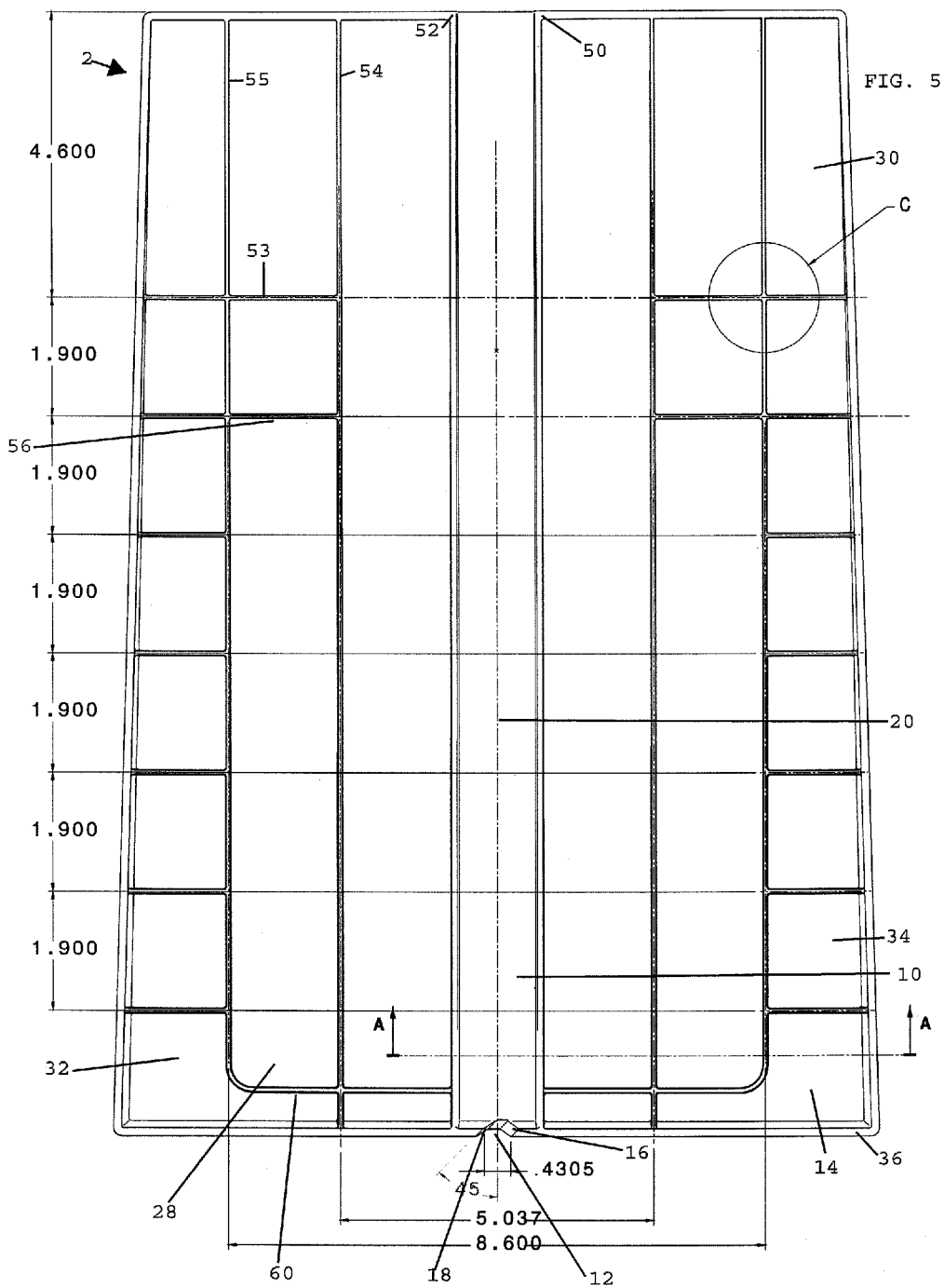
FIG. 5 is an illustration of the bottom of an exemplary shingle of the present invention, before it is bent.
Figure 6:
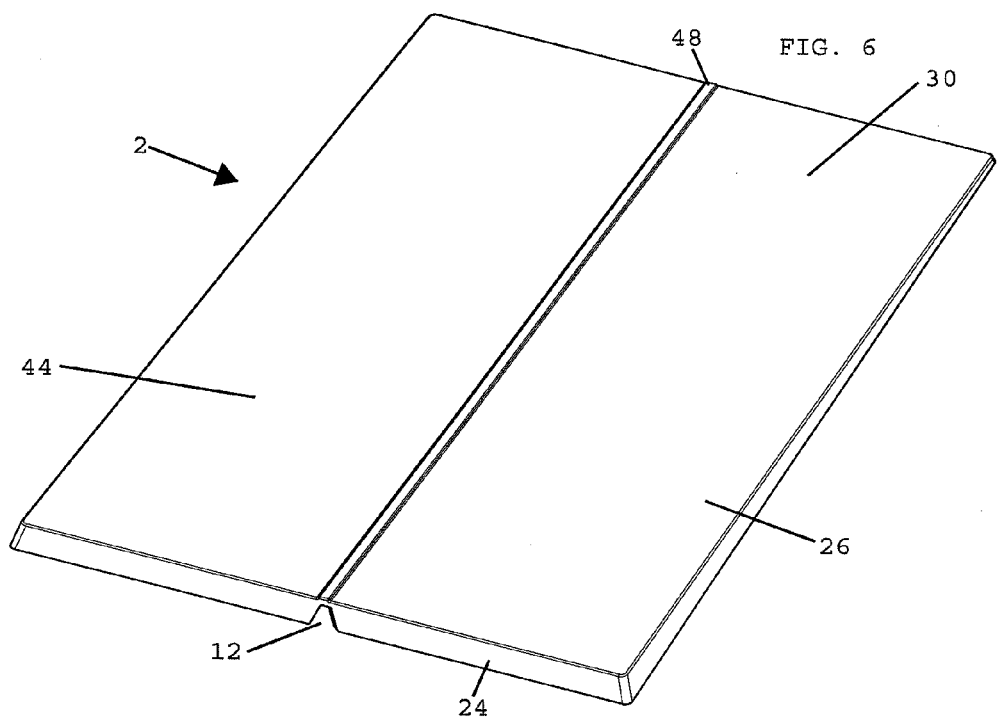
FIG. 6 is a top isometric illustration of an exemplary shingle of the present invention, before it is bent.
Figure 7:
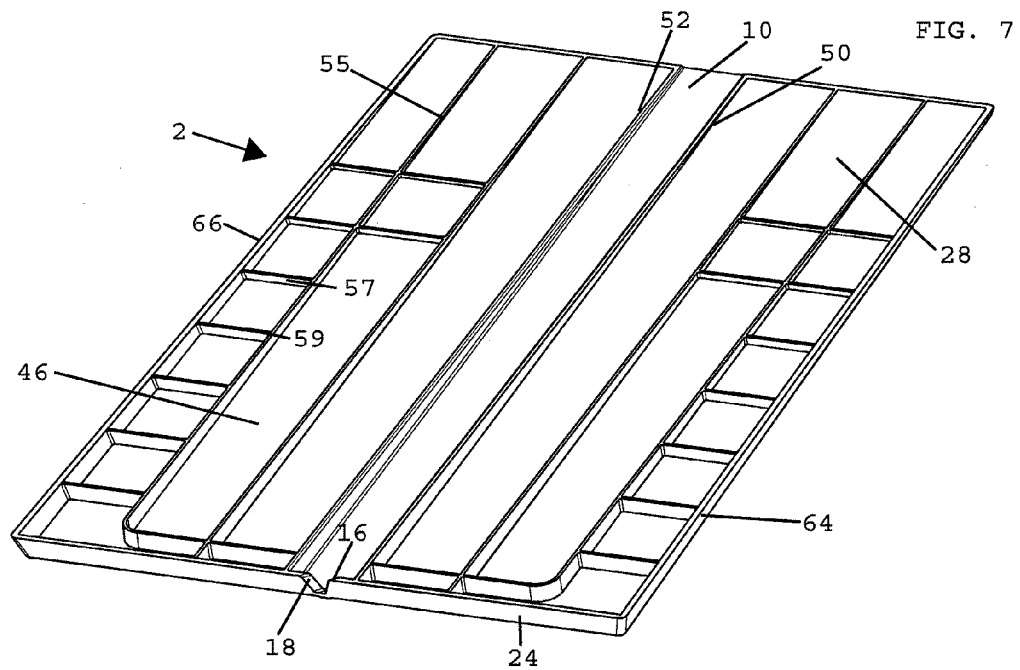
FIG. 7 is a bottom isometric illustration of the top of an exemplary shingle of the present invention, before it is bent.
Figure 8:
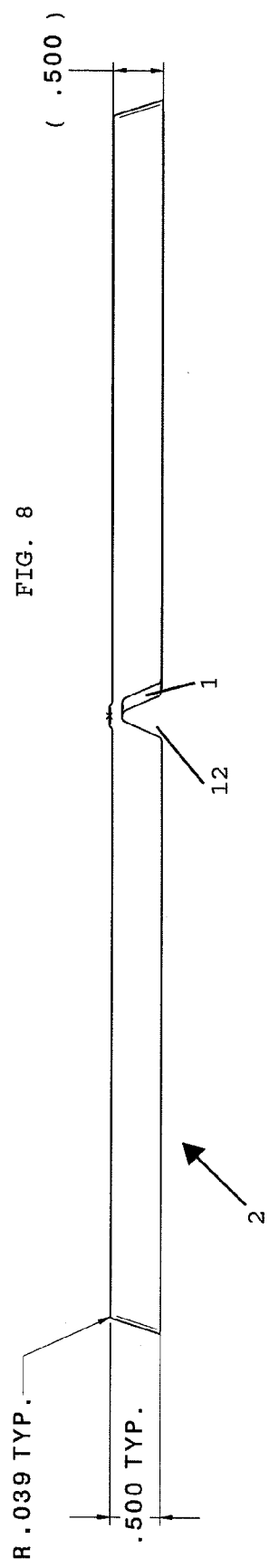
FIG. 8 is an illustration of the front of an exemplary shingle of the present invention, before it is bent.
Figure 9:
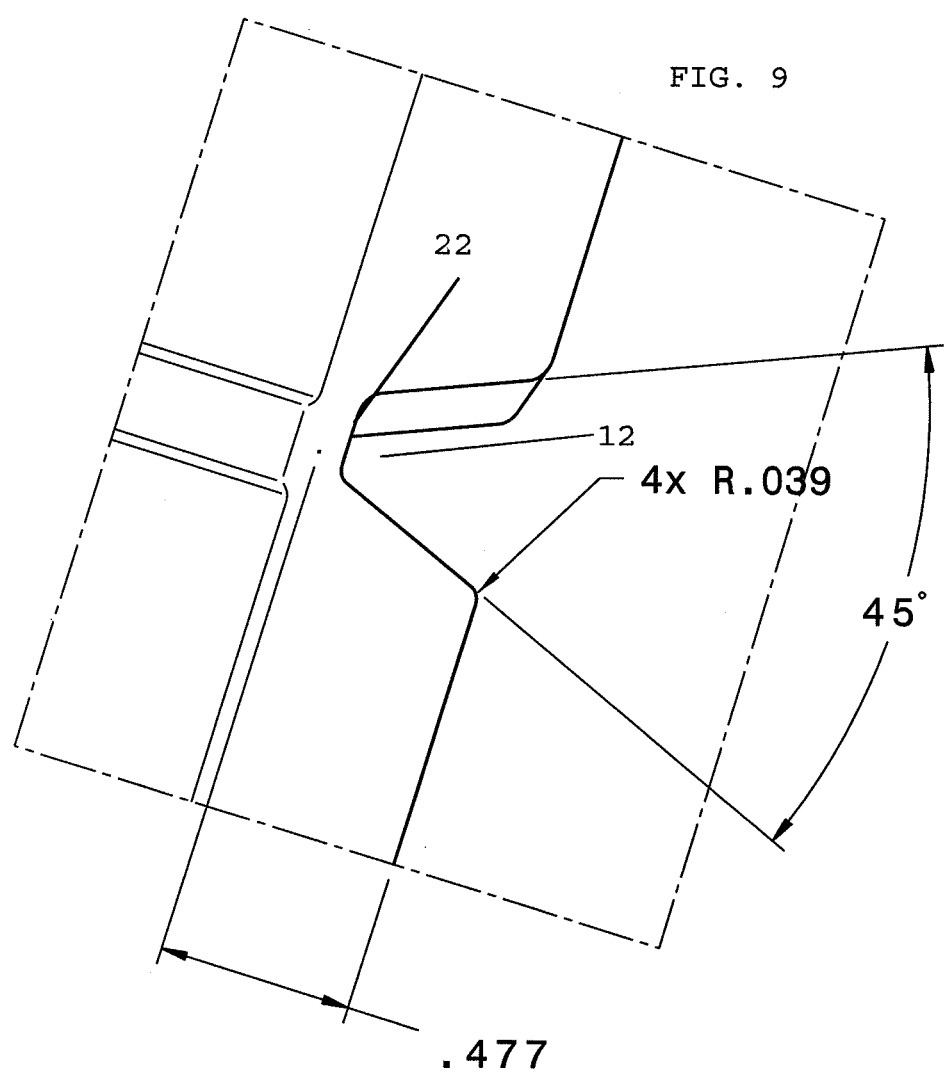
FIG. 9 is a close-up illustration of an exemplary notch of a shingle of the present invention, before it is bent.

In certain embodiments, a shingle of this invention will comprise markings, grooves, and/or other features or relief (collectively referred to as "markings") to emulate the appearance of other roofing products, such as shakes (as illustrated in FIG. 13) or slate (as illustrated in FIG. 3). In such an embodiment, the markings are preferably included on the entire front top portion of the shingle. Thus, as illustrated in FIG. 13, the front top portion 272 of the shingle 200 comprises markings, e.g., grooves 247, 249, which aid in the emulation of shake.

The front wall 24, 224 of a shingle refers to a wall downwardly disposed from the bottom of the shingle at the front edge. A notch 12 such as the notch of the embodiment of FIGS. 1-12 would represent a void or break in the front wall. Although it is preferred that, other than at the notch 12, the front wall 24 be continuous, other voids in the wall may be provided.

A preferred height of a front wall 24, 224 of a shingle 2, 200 of this invention will depend in part on the front height of other shingles to be used with a hip and ridge shingle of this invention. An exemplary height is approximately 0.5 inches. In the exemplary embodiment of FIG. 4, the front wall 24 is slanted outward. Similarly, an outwardly slanted front wall 224 is provided in the embodiment illustrated on FIG. 14.

In one embodiment, the front wall 24 of a shingle of this invention is somewhat thicker outside of the ridge portion 10, e.g., as defined by ribs 50, 52 than inside the ridge portion. For example, the front wall 24 outside of the ridge portion may be the range of ¼ inch to ⅝ inches thick while the front wall 24 inside the ridge portion 10, e.g., from a rib 50, 52 to a notch 12 may be about ⅛ of an inch thick.

Figure 11:
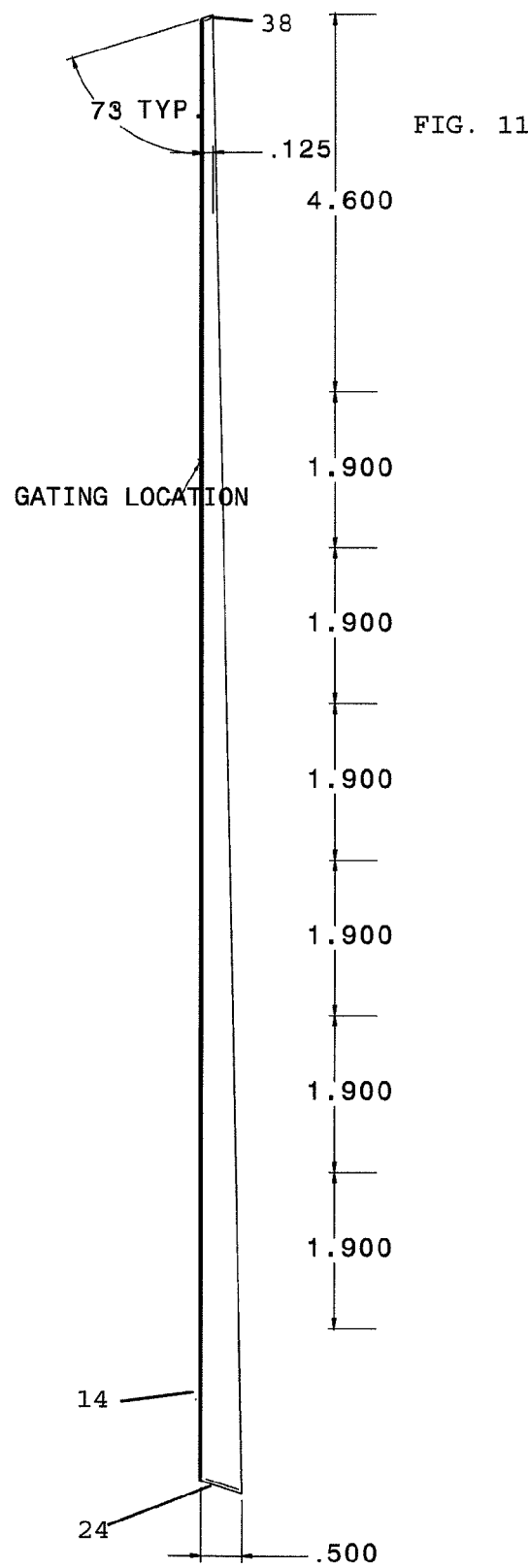
FIG. 11 is an illustration of the side of an exemplary shingle of the present invention, before it is bent.
Figure 12:
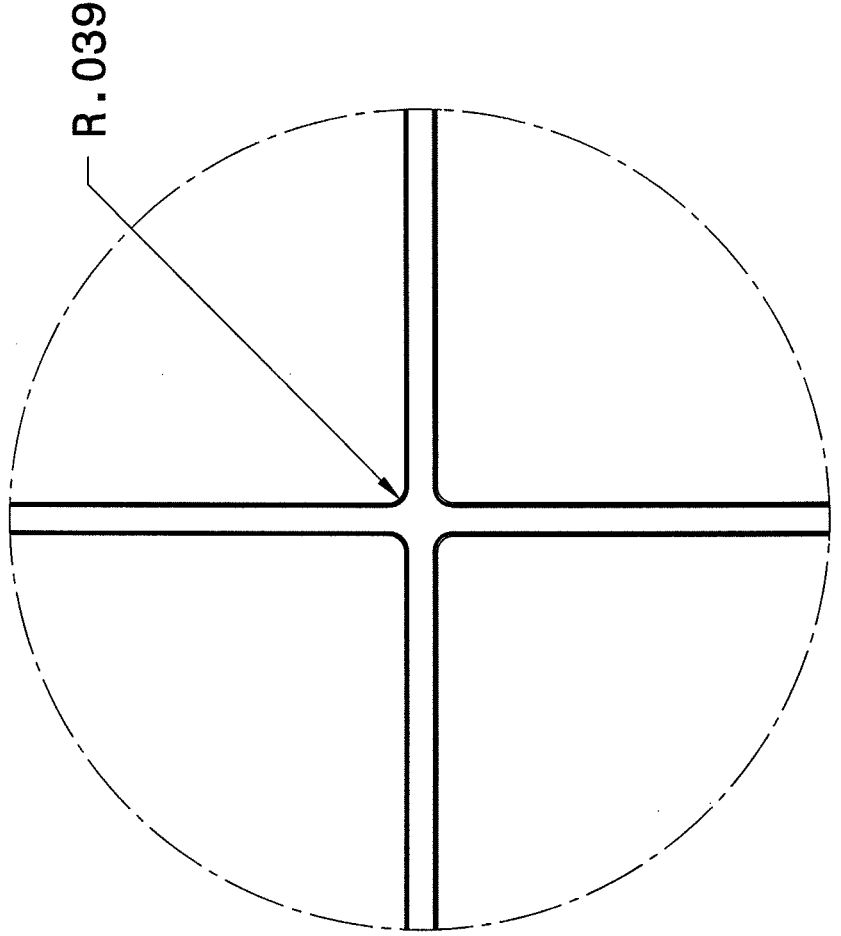
FIG. 12 is a close-up illustration of the section of the shingle of FIG. 5 marked C.

Preferably, and as illustrated on FIG. 11, a shingle 2 tapers from a higher front edge 36 to a lower rear edge 38. In the embodiment of FIGS. 1-10, the tapering feature is accomplished by providing tapered side walls 64, 66 and tapered ribs 54, 52, 50.

A shingle of this invention may comprise a rear wall. In the embodiment illustrated in FIG. 13-15, the rear wall 274 is downwardly disposed from the bottom 228 of the shingle 200 at the rear edge 238. As shown in FIGS. 13-15, a gap 292 in the rear wall 274 at the ridge point 210 accommodates bending at the ridge point 210. Optional ribs 270 mean that if such a shingle is used as a flat shingle, the gap 292 in the rear wall 274 does not unduly compromise strength and/or stability at the rear portion of the shingle 200.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the system discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

We claim:

1. A shingle for use on a roof hip or ridge, the shingle comprising:
    (a) a front edge, a rear edge, a first side edge, and a second side edge, wherein the front edge, the rear edge, the first side edge, and the second side edge define an isosceles trapezoid;
    (b) a ridge portion;
    (c) a notch comprising a chamfer that diverges from the notch; and
    (d) a plurality of ribs downwardly disposed from a bottom of the shingle; wherein the shingle is formed as a single unit and comprises sufficient flexibility to accommodate a range of pitches of roof hips and ridges.

2. The shingle of claim 1 further comprising an alignment indicator.

3. The shingle of claim 1 further comprising a plurality of support ribs downwardly disposed from a bottom of the shingle at or near a preferred fastener insertion point of the shingle.

4. The shingle of claim 1 wherein the notch further comprises a flat portion parallel to a top surface of the shingle.

5. The shingle of claim 1 wherein the angle of the notch is between approximately 30 degrees and approximately 60 degrees.

6. The shingle of claim 1 wherein the notch is in the front edge of the shingle and within the ridge portion of the shingle.

7. The shingle of claim 6 wherein the front edge comprises a front wall and wherein the notch is in the front wall of the shingle.

8. The shingle of claim 7 wherein the front edge comprises a front wall and wherein the notch is in the front wall of the shingle.

9. A shingle for use on a roof hip or ridge, the shingle comprising:
    (a) a front edge, a rear edge, a first side edge, and a second side edge, wherein the front edge, the rear edge, the first side edge, and the second side edge define an isosceles trapezoid;
    (b) a ridge portion;
    (c) a notch comprising a chamfer that diverges from the notch;
    (d) a top portion, wherein the top portion comprises relief emulating shake or slate;
    (e) a plurality of support ribs downwardly disposed from a bottom of the shingle; and
    (f) wherein the shingle is formed as a single unit and comprises a bend at the ridge portion and further comprises sufficient flexibility to accommodate a range of pitches of roof hips and ridges.

10. The shingle of claim 9 wherein the plurality of support ribs comprises at least one rib contained within the ridge portion and wherein said rib is substantially parallel to the front edge of the shingle.

11. The shingle of claim 9 wherein the angle of the notch is between approximately 30 degrees and approximately 60 degrees.

12. The shingle of claim 9 wherein the notch is in the front edge of the shingle and within the ridge portion of shingle.

13. The shingle of claim 9 wherein the notch further comprises a flat portion parallel to the top portion of the shingle.

14. A method of installing a shingle on a roof hip or ridge, the roof hip or ridge comprising a pitch, the method comprising:
(a) providing a plurality of shingles comprising (i) a front edge, a rear edge, a first side edge, and a second side edge, wherein the front edge, the rear edge, the first side edge, and the second side edge define an isosceles trapezoid; (ii) a ridge portion; (iii) a notch comprising a chamfer that diverges from the notch; (iv) a front top portion, wherein the front top portion comprises relief emulating shake or slate; (v) a rear top portion; (vi) a first side and a second side; (vii) a plurality of support ribs downwardly disposed from a bottom of the shingle; and (viii) a bend at the ridge portion and further comprises sufficient flexibility to accommodate a range of pitches of roof hips and ridges;
(b) positioning the ridge portion of a first shingle over the apex of the hip or ridge;
(c) bending the first shingle so that the angle of the bend at the ridge portion is substantially the same as the angle of the apex;
(d) inserting a first fastener through the rear top portion of the first side of the first shingle;
(e) inserting a second fastener through the rear top portion of the second side of the first shingle;
(f) positioning the ridge portion of a second shingle over the apex of the hip or ridge and over the rear top portion of the first shingle;
(g) inserting a first fastener through the rear top portion of the first side of the second shingle;
(e) inserting a second fastener through the rear top portion of the second side of the second shingle.

15. A shingle for use on a roof hip or ridge, the shingle comprising:
(a) a front edge, a rear edge, a first side edge, and a second side edge, wherein the front edge, the rear edge, the first side edge, and the second side edge define an isosceles trapezoid;
(b) a top surface;
(c) a ridge portion;
(d) a notch in the ridge portion of the shingle comprising a chamfer that diverges from the notch; and
(e) wherein the shingle comprises sufficient flexibility to accommodate a range of pitches of roof hips and ridges.

16. The shingle of claim 15 wherein the notch further comprises a flat portion parallel to the top surface of the shingle.

17. The shingle of claim 15 wherein the angle of the notch is between approximately 30 degrees and approximately 60 degrees.

18. The shingle of claim wherein the front edge comprises a front wall and wherein the notch is in the front wall of the shingle.

* * * * *